(12) United States Patent
Nakano et al.

(10) Patent No.: US 8,871,289 B2
(45) Date of Patent: Oct. 28, 2014

(54) ACIDIC MILK DRINK

(75) Inventors: Masatoshi Nakano, Minato-ku (JP); Yukiko Kobayashi, Minato-ku (JP); Ryoichi Akahoshi, Minato-ku (JP)

(73) Assignee: Kabushiki Kaisha Yakult Honsha, Tokyo (JP)

( * ) Notice: Subject to any disclaimer, the term of this patent is extended or adjusted under 35 U.S.C. 154(b) by 893 days.

(21) Appl. No.: 11/597,546

(22) PCT Filed: May 24, 2005

(86) PCT No.: PCT/JP2005/009399
§ 371 (c)(1),
(2), (4) Date: Nov. 27, 2006

(87) PCT Pub. No.: WO2005/115157
PCT Pub. Date: Dec. 8, 2005

(65) Prior Publication Data
US 2007/0231442 A1 Oct. 4, 2007

(30) Foreign Application Priority Data
May 27, 2004 (JP) .................................. 2004-157133

(51) Int. Cl.
*A23C 9/00* (2006.01)
*A23L 1/308* (2006.01)
*A23C 9/13* (2006.01)

(52) U.S. Cl.
CPC ........... *A23L 1/3088* (2013.01); *A23V 2002/00* (2013.01); *A23C 9/13* (2013.01)
USPC .............................. 426/580; 426/34; 426/491

(58) Field of Classification Search
USPC .................................. 426/34, 490, 491, 580
See application file for complete search history.

(56) References Cited

U.S. PATENT DOCUMENTS

| 4,194,019 A * | 3/1980 | Yasumatsu et al. ............ 426/580 |
| 8,518,465 B2 * | 8/2013 | Nakano et al. .................. 426/74 |
| 2003/0175398 A1 | 9/2003 | Ogasawara et al. |
| 2004/0213882 A1 * | 10/2004 | Lauridsen ...................... 426/548 |

FOREIGN PATENT DOCUMENTS

| EP | 1 389 426 A1 | 2/2004 |
| JP | 62-220169 | 9/1987 |
| JP | 04-311378 | 11/1992 |
| JP | 4-311378 | 11/1992 |
| JP | 04-356169 | 12/1992 |
| JP | 4-356169 | 12/1992 |
| JP | 10-004876 | 1/1998 |
| JP | 10-4876 | 1/1998 |
| JP | 2001-190220 | 7/2001 |
| JP | 2001-314152 | 11/2001 |
| JP | 3313104 | 5/2002 |
| JP | 3400777 | 2/2003 |
| JP | 2004-41118 | 2/2004 |
| JP | 2004-283182 | 10/2004 |
| KR | 10-0173798 | 11/1998 |
| WO | 92/04829 | 4/1992 |

OTHER PUBLICATIONS

P.R. Murray, "Polydextrose", Low Calorie Product, 1988, pp. 83-100.
Office Action as received in corresponding Korean Patent Application No. 10-2006-7024732 dated Feb. 29, 2012.
Donna Brooks, "Polydextrose for Adding Fiber", 2003, pp. 1-2.

* cited by examiner

*Primary Examiner* — Leslie Wong
(74) *Attorney, Agent, or Firm* — Oblon, Spivak, McClelland, Maier & Neustadt, L.L.P.

(57) ABSTRACT

It is intended to provide an acidic milk drink with a favorable flavor which has an excellent quality stability and a light texture required for low calorie drinks even at a low milk solid non-fat content in the acidic milk drink. Namely, an acidic milk drink characterized by containing polydextrose and sucrose at a solid non-fat milk content of 1.0 to 4.0% by mass.

19 Claims, No Drawings

ACIDIC MILK DRINK

DETAILED DESCRIPTION OF THE INVENTION

1. Technical Field

The present invention relates to an acidic milk drink with excellent quality stability and great flavor even when the acidic milk drink has a low solids not fat (SNF) content. More specifically, the invention relates to an acidic milk drink with great flavor, where the deterioration of the quality thereof, such as the aggregation and precipitation of milk protein therein, can be modified and reduced without any use of stabilizers even when the total caloric value of the acidic milk drink is reduced. The invention also pertains to a method for producing the acidic milk drink, as well as a method for preventing the deterioration of the quality of the acidic milk drink.

2. Related Art

Acidic milk drinks such as fermented milk and drinks prepared with lactic acid bacteria have great taste and possibly have various physiological functions. In recent years, therefore, such acidic milk drinks are widely ingested as commercial products satisfying consumers' needs.

These acidic milk drinks are produced from a raw material milk type acidified by microbial fermentation and the addition of sour agents as the base, so the resulting drinks are hardly ingestible because the drinks have poor flavor such as sour taste when they are ingested as they are. So as to satisfy the consumers' taste, therefore, appropriate amounts of carbohydrate are added. Additionally, the carbohydrate is added owing to the effects thereof on the prevention of the aggregation and precipitation of milk protein-suspended particles.

In recent years, alternatively, the attention toward health has been increasing in dietary life. The market of diet foods with reduced calories, namely so-called low-calorie foods has been enlarging. Following this trend, products with reduced calories from various foods have been developed. Such needs have emerged in the field of the acidic milk drinks.

So as to meet such needs, the use of carbohydrate as one of main elements causing caloric increase should essentially be limited in producing acidic milk drinks with reduced calories.

However, it has been known that carbohydrate has effects on suppressing the aggregation and precipitation of milk protein-suspended particles. When the use of carbohydrate is limited so as to adjust the calorie content, the dispersion stability of milk protein gets highly unstable, making it difficult to obtain acidic milk drinks with excellent storage stability by suppressing the aggregation and precipitation of milk protein therein. When the SNF (solids-not-fat) content is low in an acidic milk drink, in particular, it is difficult to obtain such an acidic milk drink as described above.

For reducing the calorie content of acidic milk drinks with low SNF content, therefore, artificial highly sweet sweeteners are used, such as sucralose and aspartame, providing sweetness in small amounts but hardly giving caloric content.

Additionally, various stabilizers are also used, such as pectin, carboxymethyl cellulose, propylene glycol alginate, carrageenan, locust bean gum and soybean polysaccharides for allowing them to make contributions to the dispersion stability of milk protein.

For reduced calorie milk-containing acidic drinks, in particular, a method using pectin and soybean polysaccharides as stabilizers singly or in combination has been reported; see Japanese Patent No. 3400777 and Japanese Patent No. 3313104 (patent references 1 and 2).

When the SNF in an acidic milk drink is low, however, the viscosity of the resulting product is increased via the use of stabilizers such as pectin, although the dispersion stability of the milk protein is improved in that case. Therefore, in that case, the resulting product may sometimes be adversely affected concerning easy drinkability and food texture. Such product has problems such as the deterioration of light texture including refreshing food texture and non-sticky texture demanded toward calorie-reduced drink types.

In cases where the calorie of such acidic milk drinks with low SNF are to be reduced, additionally, the amount of carbohydrate to be used is limited. For the purpose of improving flavor and quality stability, thus, plural materials should essentially be used. Accordingly, problems in terms of cost and production emerge in that case.

[Patent reference 1] Japanese Patent No. 3400777
[Patent reference 2] Japanese Patent No. 3313104

DISCLOSURE OF THE INVENTION

Problems that the Invention is to Solve

It is an object of the invention to provide an acidic milk drink with high quality stability and great flavor with light texture demanded toward for calorie-reduced acidic milk drink types even when the SNF content in the acidic milk drink is low, as well as a method for producing an acidic milk drink with no problems in terms of cost and production even when the amount of carbohydrate used is limited so as to reduce the calorie content of the acidic milk drink.

Means for Solving the Problems

The present inventors made investigations so as to solve these problems. Consequently, the inventors found that the problems can be overcome by blending polydextrose and sugar in combination in an acidic milk drink at a SNF content of 1.0 to 4.0% by mass. Thus, the invention has been achieved.

Specifically, the invention provides an acidic milk drink at a SNF content of 1.0 to 4.0% by mass, which contains polydextrose and sugar.

Additionally, the invention provides a method for producing an acidic milk drink at a SNF content of 1.0 to 4.0% by mass, comprising blending polydextrose and sugar in the acidic milk drink.

Still additionally, the invention provides a method for preventing the deterioration of the quality of an acidic milk drink at a SNF content of 1.0 to 4.0% by mass, comprising blending polydextrose and sugar in the acidic milk drink.

Advantages of the Invention

The acidic milk drink in accordance with the invention can have improved dispersion stability of milk protein due to the combined use of polydextrose and sugar without any use of stabilizers and the like, even when the acidic milk drink has a low SNF content, so that the aggregation and precipitation of milk protein can be suppressed to prevent the deterioration of the quality. Thus, the acidic milk drink consequently has excellent storage stability. Furthermore, the flavor of the acidic milk drink is excellent and it has a light texture.

BEST MODE FOR CARRYING OUT THE INVENTION

The acidic milk drink of the invention is prepared by allowing an acidic milk drink at a SNF of 1.0 to 4.0% by mass to contain polydextrose and sugar.

The acidic milk drink of the invention is prepared by diluting any of the acidic raw material milk types described below with water and the like to adjust the SNF content to 1.0 to 4.0% by mass, preferably 3.0 to 4.0% by mass, and adjusting the pH to 3.0 to 4.0.

(1) A fresh bacterium type acidic raw material milk prepared by allowing microorganisms such as lactic acid bacteria and bifidus bacteria to interact with liquid milk types derived from animals and vegetables, such as cow milk, goat milk, sheep milk and soybean milk, defatted powdered milk, whole powdered milk or powdered milk, and milk types and the like as prepared by reducing condensed milk.

(2) An acidic raw material milk containing killed bacteria prepared by sterilizing the acid raw material milk (1).

(3) An acidic raw material milk type prepared by simply adding various sour agents to the milk described above and the like.

In case of producing the milk types (1) and (2) microorganisms such as lactic acid bacteria and bifidus bacteria interacting with milk and the like include, for example, bacteria of genus *Lactobacillus* such as *Lactobacillus casei*, *Lactobacillus mali*, *Lactobacillus acidophilus*, *Lactobacillus delbrueckii* subspecies. *bulgaricus*, and *Lactobacillus herveticus*; bacteria of genus *Streptococcus*, such as *Streptococcus thermophilus*; bacteria of genus *Lactococcus*, such as *Lactococcus lactis* subspecies *lactis* and *Lactococcus lactis* subspecies *cremoris*; bacteria of genus *Enterococcus*, such as *Enterococcus faecalis*; or bacteria of genus *Bifidobacterium*, such as *Bifidobacterium breve*, *Bifidobacterium bifidum*, and *Bifidobacterium longum*; bacteria of genera *Bacillus*, *Acetobacter* and *Gluconobacter*; and yeast species of genera *Saccharomyces* and *Candida*. Preferably any of the microorganisms above may be used. These microorganisms may be used singly or in combinations of two or more. Among the microorganisms, in particular, one or more species selected from *Lactobacillus casei*, *Lactobacillus acidophilus*, *Lactobacillus delbrueckii* subspecies. *bulgaricus* and *Streptococcus thermophilus* are preferably used because the resulting flavor of the milk types (1) and (2) is greater.

Any general method for producing drinks and foods from fermented milk is used with no specific limitation as the fermentation method for allowing the microorganisms to interact with milk and the like. A method suitable for the fermentation of microorganisms for use in fermentation is appropriately selected from stationary fermentation, agitation fermentation, shaking fermentation and aeration fermentation. Among them, stationery fermentation is preferably used.

Any conditions for use in producing drinks and foods with fermented milk may be used with no specific limitation, as the conditions for the fermentation to allow the microorganisms to interact with milk and the like. For example, the fermentation may satisfactorily be done at a temperature of 30 to 40° C. to pH 3.0 to 4.0.

In case that the acidic raw material milk (3) is to be used as an acidic raw material milk for the acidic milk drink, various sour agents may satisfactorily be added to milk and the like for use in general foods, so as to make the pH of the final acidic milk drink to pH 3.0 to 4.0. Specific sour agents include for example various fruit juices of apple, blue berry and citrus fruits, extracts or mixtures thereof, organic acids such as lactic acid, citric acid, malic acid, tartaric acid, gluconic acid, and succinic acid; and inorganic acids such as phosphoric acid.

The acidic raw material milk is homogenized if necessary. The homogenization is preferably done at a pressure of about 15 MPa. Via the homogenization process, the resulting texture (food texture) gets better, while the milk protein in blend with polydextrose and sugar can get greater dispersion stability.

Polydextrose to be blended in the acidic milk drink of the invention is a polysaccharide prepared by the polymerization of glucose, sorbitol and citric acid at high temperature and high pressure. In the polydextrose, from monosaccharide to polysaccharides with molecular weights of several tens thousands exist in mixture. Specific product names include "Litesse" (manufactured by DANISCO CULTOR; average molecular weight of 1,200). Polydextrose is added at an amount of 1.1 to 7.0% by mass, preferably 1.1 to 4.6% by mass per product.

Additionally, the sugar to be blended in the acidic milk drink in accordance with the invention is the generic name of a processed product containing sucrose composed of glucose and fructose as the main components and specifically includes for example soft sugar, granulated sugar, crystal sugar, processed sugar and liquid sugar. In accordance with the invention, the sugar can be used without any specific limitation. Preferably, granulated sugar and liquid sugar are used. Specific product names include Granulated Sugar (manufactured by Itochu-sugar Company; manufactured by Nisshin-sugar Company); and Fine Liquor (manufactured by Fuji Nihon Seito). The amount of the sugar to be added is at 3.8 to 9.5% by mass, preferably 3.8 to 6.2% by mass per product.

The timing and method for blending polydextrose and sugar in the acidic milk drink are not specifically limited. Polydextrose and sugar may satisfactorily be added at any stage of preparing the acidic milk drink. Preferably, syrup containing polydextrose and sugar as prepared by the general method is blended in a preliminarily prepared acidic milk drink.

The syrup is prepared for example by dissolving sugar and polydextrose in water heated to 70° C. or more and then sterilizing the resulting solution at 112° C. for 10 seconds on plate.

The acidic milk drink thus obtained in accordance with the invention can get improvement in the quality deterioration such as aggregation and precipitation of milk protein which emerge at low SNF, without any use of stabilizers having been used in the related art, such as pectin, carboxymethyl cellulose, propylene glycol alginate, carrageenan, locust bean gum and soybean polysaccharides. Additionally, the flavor is great with light texture.

Additionally, preferably, the acidic milk drink of the invention is adjusted to a caloric value per 100-ml drink of 40 to 58 kcal, preferably 48 to 58 kcal, using polydextrose and sugar.

The caloric value of the acidic milk drink may be adjusted using polydextrose and sugar, specifically, in a weight ratio of polydextrose to sugar ranging from 10:90 to 65:35, preferably ranging from 10:90 to 42:58.

Other food materials may additionally be blended in the acidic milk drink of the invention within a range that does not impair the effect of the invention. Examples of such food materials include sugars such as fruit sugar, glucose, isomerized sugar, fructose, palatinose, trehalose, lactose and xylose; sugar alcohols such as sorbitol, xylitol, erythritol, lactitol, palatinit, reduced starch syrup and starch syrup of reduced maltose; and highly sweet sweeteners such as aspartame, sucralose, stevia and alitame. In accordance with the invention, highly sweet sweeteners such as aspartame hardly influencing the calorie of the acidic milk drink are preferably blended among them. Additionally, emulsifying agents such as sucrose fatty acid ester, glycerin fatty acid ester and lecithin, vitamins such as vitamin A, vitamin B group, vitamin C, vitamin D and vitamin E, and minerals such as iron, manganese and zinc may also be blended other than those described above. These food materials may be added at any stage of producing the acidic milk drink of the invention.

EXAMPLES

The invention is further described in detail in the following Examples and Test Examples, which should not be construed as limiting the present invention.

Test Example 1

Production of Acidic Milk Drink (1)

An aqueous solution prepared by dissolving 14.9% by mass of powdered skim milk and 3.5% by mass of glucose was sterilized at 121° C. for 3 seconds on plate, which was then inoculated with a starter of *Lactobacillus casei* for culturing to pH 3.6. The culture was cooled to get a fermented product. Subsequently, the fermented product was homogenized with a homogenizer at 15 MPa. 49.6 parts by weight of the resulting homogenate was mixed with 50.4 parts by weight of each of the syrup types of the following compositions as separately prepared and 115 parts by weight of water, to obtain comparative products 1 through 3 (SNF of 3.2%).

The syrup types were obtained by dissolving the following ingredients in water, sterilizing the resulting solutions at 112° C. for 10 seconds on plate and cooling the solutions. Further, the syrup 1 was used in the comparative product 1; the syrup 2, in the comparative product 2; and the syrup 3, in the comparative product 3.

Syrup Compositions

Syrup 1: polydextrose at 46.8% by mass and aspartame at 0.27% by mass

Syrup 2: polydextrose at 46.8% by mass, aspartame at 0.27% by mass and 1.3% by mass of pectin Syrup 3: polydextrose at 46.8% by mass, aspartame at 0.27% by mass, and carboxymethyl cellulose (CMC) at 2.1% by mass Table 1 shows the compositions of the syrup types contained in the comparative products 1 through 3 and the calories thereof per 100-ml product. Immediately after production and after subsequent storage at 10° C. for 14 days, the appearance, precipitation, whey-off and flavor of the comparative products were evaluated according to the following standards. Furthermore, the light texture of the products after the storage for 14 days was evaluated according to the following standards. The results are shown in Table 2.

<Standards for Determining Appearance>
o: No aggregation or like observed.
☐: More or less aggregated.
x: Aggregated.

<Standards for Determining Precipitation/Whey-Off>
–: Not observed
±: Slightly observed, with almost no problem.
+: Observed.

<Standards for Determining Flavor>
o: Great
☐: Normal
x: Poor.

<Standards for Determining Light Texture>
o: Light texture
☐: Neither the presence nor absence of light texture can be determined.
x: No light texture.

TABLE 1

|  | Polydextrose | Sugar | Aspartame | Pectin | CMC | Calories (kcal) |
|---|---|---|---|---|---|---|
| Comparative product 1 | 10.9 |  | 0.06 | — | — | 28.4 |
| Comparative product 2 | 10.9 |  | 0.06 | 0.3 | — | 28.4 |
| Comparative product 3 | 10.9 |  | 0.06 | — | 0.5 | 28.4 |

Numerical figures except those expressing calorie are expressed in % by mass.

TABLE 2

|  | Immediately after production | | | After storage at 10° C. for 14 days | | |
|---|---|---|---|---|---|---|
|  | PH | Appearance | flavor | precipitation/whey-off | appearance | flavor | light texture |
| Comparative product 1 | 3.64 | x | x | + | x | x | x |
| Comparative product 2 | 3.63 | o | ☐ to x | – to ± | o | ☐ to x | x |
| Comparative product 3 | 3.64 | o | ☐ to x | – to ± | o | ☐ to x | x |

When products were prepared using aspartame to adjust the calories, they had poor flavor and poor quality. When aspartame, and pectin and carboxymethyl cellulose were used as stabilizers, the resulting products had poor drinkability and deteriorated light texture including refreshing texture and non-sticky texture demanded toward low-calorie types, although the stability of physico-chemical properties such as precipitation was improved.

Example 1

Production of Acidic Milk Drink (2)

An aqueous solution prepared by dissolving 14.9% by mass of powdered skim milk and 3.5% by mass of glucose was sterilized at 121° C. for 3 seconds on plate, which was then inoculated with a starter of *Lactobacillus casei* for culturing to pH 3.6. The culture was cooled to get a fermented product. Subsequently, the fermented product was homogenized with a homogenizer at 15 MPa. 49.6 parts by weight of the resulting homogenate was mixed with 50.4 parts by weight of each of the syrup types of the following compositions as separately prepared and 115 parts by weight of water, to obtain example products 1 through 3 and comparative product 4 (SNF of 3.2%). The syrup types were obtained by dissolving raw materials of the following compositions in water, sterilizing the resulting solutions at 112° C. for 10 seconds on plate and cooling the solutions to about 30° C. Further, the syrup 4 was used in the example product 1; the syrup 5, in the example product 2; the syrup 6, in the example product 3 and the syrup 7, in the comparative product 4.

Syrup Compositions

Syrup 4: polydextrose at 30.0% by mass, sugar at 16.0% by mass and aspartame at 0.2% by mass Syrup 5: polydextrose at 19.4% by mass, sugar at 26.2% by mass and aspartame at 0.16% by mass Syrup 6: polydextrose at 4.6% by mass, sugar at 40.8% by mass and aspartame at 0.10% by mass Syrup 7: polydextrose at 19.4% by mass, sugar at 26.2% by mass, aspartame at 0.16% by mass, and pectin at 1.3% by mass Table 3 shows the compositions of the syrup types contained in the resulting products and the calories thereof per 100-ml product. Immediately after production and after subsequent storage at 10° C. for 14 days, the same evaluation was done according to the standards in Test Example 1. The results are shown in Table 4. Table 4 additionally shows the results of the comparative product 1.

TABLE 3

|  | Polydextrose | Sugar | Aspartame | Pectin | Calories (kcal) |
|---|---|---|---|---|---|
| Comparative product 1 | 10.9 | — | 0.06 | — | 28.4 |
| Comparative product 4 | 4.6 | 6.2 | 0.04 | 0.3 | 48.0 |
| Example product 1 | 7.0 | 3.8 | 0.05 | — | 40.0 |
| Example product 2 | 4.6 | 6.2 | 0.04 | — | 48.0 |
| Example product 3 | 1.1 | 9.5 | 0.04 | — | 58.0 |

Numerical figures except those expressing calorie are expressed in % by mass.

TABLE 4

|  | Immediately after production | | | After storage at 10° C. for 14 days | | | |
|---|---|---|---|---|---|---|---|
|  | PH | appearance | flavor | precipitation/ whey-off | appearance | flavor | light texture |
| Comparative product 1 | 3.64 | x | x | + | x | x | x |
| Comparative product 4 | 3.65 | ○ | □ to x | – to ± | ○ | □ to x | x |
| Example product 1 | 3.66 | ○ | ○ | ± | ○ | ○ | ○ |
| Example product 2 | 3.67 | ○ | ○ | – to ± | ○ | ○ | ○ |
| Example product 3 | 3.67 | ○ | ○ | – to ± | ○ | ○ | ○ |

As a consequence of the test, it is indicated that in case of preparation using polydextrose and sugar, specifically polydextrose and sugar at a blend ratio within a range of 10:90 to 65:35 to adjust the calories of the resulting products to a range of 40 to 58 kcal, the resulting fermented milk products had great flavor and high stability of the quality. In case of using pectin, alternatively, the resulting product had a higher viscosity although the product had greater quality stability than the products using polydextrose and sugar. Therefore, the product had poor drinkability and deteriorated light texture including refreshing texture and non-sticky texture.

Example 2

Production of Acidic Milk Drink (3)

Using a syrup type of the following composition containing a combination of polydextrose and sugar, or a combination of indigestible dextrin and sugar or a combination of polydextrose, fructose and glucose to adjust the calorie of the resulting acidic milk drink to 48 kcal, products 1 through 4 were obtained by the same method as in Example 1. Table 5 shows the compositions of the syrup types contained in the resulting products and the calories thereof per 100-ml product. Immediately after production and after subsequent storage at 10° C. for 14 days, the same evaluation was done according to the standards in Test Example 1. The results are shown in Table 6. Herein, the syrup 8 was used in the product 1; the syrup 9, in the product 2; the syrup 10, in the product 3 and the syrup 11, in the product 4.

Syrup Compositions

Syrup 8: polydextrose at 19.4% by mass, sugar at 26.2% by mass and aspartame at 0.16% by mass Syrup 9: indigestible dextrin at 19.4% by mass, sugar at 26.2% by mass and aspartame at 0.16% by mass Syrup 10: polydextrose at 19.4% by mass, fructose at 13.1% by mass, glucose at 13.1% by mass and aspartame at 0.16% by mass Syrup 11: polydextrose at 19.4% by mass and sugar at 26.2%

TABLE 5

|  | Polydextrose | Indigestible dextrin | Sugar | Aspartame | Fructose | Glucose | Calories (kcal) |
|---|---|---|---|---|---|---|---|
| Product 1 | 4.6 | — | 6.2 | 0.04 | — | — | 48.0 |
| Product 2 | — | 4.6 | 6.2 | 0.04 | — | — | 48.0 |

TABLE 5-continued

|  | Polydextrose | Indigestible dextrin | Sugar | Aspartame | Fructose | Glucose | Calories (kcal) |
|---|---|---|---|---|---|---|---|
| Product 3 | 4.6 | — | — | 0.04 | 3.1 | 3.1 | 48.0 |
| Product 4 | 4.6 | — | 6.2 | — | — | — | 48.0 |

Numerical figures except those expressing calorie are expressed in % by mass.

TABLE 6

|  | Immediately after production | | | After storage at 10° C. for 14 days | | | |
|---|---|---|---|---|---|---|---|
|  | pH | appearance | flavor | precipitation/ whey-off | appearance | flavor | light texture |
| Product 1 | 3.66 | ○ | ○ | − to ± | ○ | ○ | ○ |
| Product 2 | 3.67 | ○ | □ | ± to + | ○ | □ | □ to ○ |
| Product 3 | 3.66 | ○ | □ to ○ | − to ± | ○ | □ to ○ | ○ |
| Product 4 | 3.66 | ○ | x | − to ± | ○ | x | ○ |

As a consequence of Table 6, it was found that in case of using a combination of polydextrose and sugar and a combination of polydextrose, fructose and glucose in the syrup types, fermented milk drinks with great flavor and good stability of the quality could be obtained and that the combination of polydextrose and sugar achieved better flavor and higher stability. In case of using a combination of indigestible dextrin and sugar in the syrup, it was found that no great flavor was observed and that the resulting physico-chemical properties after storage were unstable. Further, it was found that the effect on product stability was sufficiently obtained from the simple combination of polydextrose and sugar.

INDUSTRIAL APPLICABILITY

The acidic milk drink of the invention has improved dispersion stability of milk protein even at a low SNF content without any use of other stabilizers and the like, because it contains polydextrose and sugar, which suppress the aggregation and precipitation of milk protein and prevent the deterioration of the quality and providing an acidic milk drink with excellent storage stability.

Additionally, even when calorie content of the acidic milk drink of the invention is reduced, it retains great flavor and light texture, including both a refreshing food texture and non-sticky texture, compared with an acidic milk drink prepared using stabilizers and the like.

The invention claimed is:

1. A stable, sweetened, lightly textured, low calorie acidic milk drink free of conventional stabilizers having:
   1.1 to 4.6% by mass polydextrose and 6.2 to 9.5% by mass sugar, wherein the mass ratio of the polydextrose to the sugar ranges from 10:90 to 42:58;
   a SNF (solids-not-fat) content ranging from 1.0 to 4.0%, and
   a caloric content ranging from 45 to 58 kcal/ml;
   wherein said stable, sweetened, light acidic milk beverage does not contain the conventional stabilizers carboxymethyl cellulose, propylene glycol alginate, carrageenan, locust bean gum or soybean polysaccharides;
   wherein said stable, sweetened, light acidic milk beverage has been stabilized without heating the sweetened, light acidic milk beverage above 100° C.; and
   wherein the acidic milk drink is stable as determined by the absence of precipitation or whey-off after its storage at 10° C. for 14 days.

2. The stable, sweetened, lightly textured, low calorie acidic milk drink of claim 1 that has a pH ranging from 3.0 to 4.0.

3. The stable, sweetened, lightly textured, low calorie acidic milk drink of claim 1, wherein the acidic raw material milk is prepared by interacting milk with lactic acid bacteria or bifidus bacteria.

4. The stable, sweetened, lightly textured, low calorie acidic milk drink of claim 1, wherein the acidic raw material milk is prepared from a sterilized raw material milk and then inoculating it with lactic acid bacteria or bifidus bacteria.

5. The stable, sweetened, lightly textured, low calorie acidic milk drink of claim 1, wherein the acidic raw material milk is prepared by adding at least one souring agent to a raw material milk.

6. The stable, sweetened, lightly textured, low calorie acidic milk drink of claim 1, wherein the acidic raw material milk is prepared from cow's milk.

7. The stable, sweetened, lightly textured, low calorie acidic milk drink of claim 1, which is homogenized.

8. The stable, sweetened, lightly textured, low calorie acidic milk drink of claim 1, which does not contain a stabilizer selected from the group consisting of pectin, carboxymethyl cellulose, propylene glycol alginate, carrageenan, locust bean gum and soybean polysaccharides.

9. The stable, sweetened, lightly textured, low calorie acidic milk drink of claim 1, which contains at least one sweetener selected from the group consisting of aspartame, sucralose, stevia, and alitame.

10. The stable, sweetened, lightly textured, low calorie acidic milk drink of claim 1, which has a caloric value ranging from 40 to 58 kcal per 100 ml.

11. A method for producing the stable, sweetened, lightly textured, low calorie acidic milk drink of claim 1, comprising:
   preparing an acidic milk raw material that has a solids-not-fat (SNF) content of 1.0 to 4.0%,
   blending polydextrose and sugar into the acidic milk raw material at a weight ratio of polydextrose to sugar ranging from 10:90 to 42:58 based on the weights of the polydextrose and sugar to produce the stable, sweetened, light acidic milk beverage;

wherein the stable, sweetened, light acidic milk beverage has not been heated above 100° C.

12. The method of claim 11 comprising:
blending polydextrose and sugar at a weight ratio of 10:90 to 42:58 into the acid milk raw material having a solids-not-fat (SNF) content of 3.0 to 4.0% by mass;
wherein said polydextrose and sugar are present in amounts that suppress the aggregation and precipitation of milk protein; and
wherein a stabilizer selected from the group consisting of pectin, carboxymethyl cellulose, propylene glycol alginate, carrageenan, locust bean gum and soybean polysaccharides is not added.

13. The method of claim 11, further comprising adjusting the caloric content of the acidic milk drink to contain 45 to 58 kcal per 100 ml using polydextrose and sugar.

14. A stable, sweetened, lightly textured, low calorie acidic milk drink having a pH ranging from 3.0 to 4.0 containing
1.0 to 4.0% by mass solids-not-fat,
1.1 to 4.6% by mass polydextrose,
6.2 to 9.5% by mass sugar;
wherein the mass ratio of the polydextrose to the sugar ranges from 10:90 to 42:58;
wherein said acidic milk drink has been stabilized without heating the stable, sweetened, lightly-textured acidic milk drink above 100° C., and
wherein no precipitation or whey-off occurs after storage of the acidic milk drink at 10° C. for 14 days.

15. The stable, sweetened, lightly textured, low calorie acidic milk drink of claim 14 that contains 45 to 58 kcal per 100 ml.

16. The stable, sweetened, lightly textured, low calorie acidic milk drink of claim 1 that is prepared from a fresh bacterium type raw material milk to which polydextrose and sugar have been added, but which has not been sterilized.

17. The stable, sweetened, lightly textured, low calorie acidic milk drink of claim 1 that is prepared by diluting an acidic raw material milk to adjust the SNF to 1.0 to 4.0% by mass.

18. The stable, sweetened, lightly textured, low calorie acidic milk drink of claim 1 that has an SNF of at least 1.0 but less than 3.0.

19. The stable, sweetened, lightly textured, low calorie acidic milk drink of claim 1 that has an SNF ranging from 3.0 to 4.0.

* * * * *